(12) United States Patent
Jones et al.

(10) Patent No.: US 8,465,263 B2
(45) Date of Patent: Jun. 18, 2013

(54) DYNAMIC CONTROL OF AN ELECTRIC DRIVE

(75) Inventors: Michael B. Jones, Excelsior, MN (US); Gregory Wayne Parkhurst, Brooklyn Park, MN (US); Timothy Woodward Zeigler, Independence, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 370 days.

(21) Appl. No.: 12/488,804

(22) Filed: Jun. 22, 2009

(65) Prior Publication Data
US 2010/0322795 A1    Dec. 23, 2010

(51) Int. Cl.
*F04B 49/06*    (2006.01)
*F04B 35/04*    (2006.01)

(52) U.S. Cl.
USPC .................. 417/44.11; 417/44.1; 417/417

(58) Field of Classification Search
USPC .......... 417/415, 411, 44.1, 44.11, 416, 417; 318/129, 127, 119, 559; 239/526, 525, 332; 222/191, 333; 173/18
See application file for complete search history.

(56) References Cited

U.S. PATENT DOCUMENTS

| | | | | |
|---|---|---|---|---|
| 3,358,206 A * | 12/1967 | Thiele | ............................. | 388/819 |
| 3,680,789 A * | 8/1972 | Wagner | ......................... | 239/332 |
| 3,731,145 A * | 5/1973 | Senay | ............................ | 361/227 |
| 4,121,141 A | 10/1978 | Frazee | | |
| 4,517,620 A * | 5/1985 | Boll | ............................... | 361/154 |
| 4,705,995 A * | 11/1987 | Boll | ............................... | 318/129 |
| 4,744,516 A * | 5/1988 | Peterson et al. | ............... | 239/128 |
| 4,945,269 A * | 7/1990 | Kamm | ............................. | 310/15 |
| 5,032,772 A * | 7/1991 | Gully et al. | .................... | 318/135 |
| 5,086,491 A | 2/1992 | Cuneo | | |
| 5,141,162 A * | 8/1992 | Gunderson et al. | ............ | 239/332 |
| 5,658,132 A | 8/1997 | Akazawa et al. | | |
| 5,711,483 A * | 1/1998 | Hays | ................................. | 239/71 |
| 6,055,359 A * | 4/2000 | Gillett | ............................ | 388/819 |
| 6,056,215 A * | 5/2000 | Hansinger et al. | ............. | 239/703 |
| 6,168,093 B1 * | 1/2001 | Greer et al. | .................... | 239/332 |
| 6,441,571 B1 | 8/2002 | Ibuki et al. | | |
| 6,599,107 B2 * | 7/2003 | Cooper et al. | ................ | 417/415 |
| 6,616,413 B2 * | 9/2003 | Humpheries | ................. | 417/44.1 |
| 6,623,255 B2 * | 9/2003 | Joong et al. | ................... | 417/411 |

(Continued)

FOREIGN PATENT DOCUMENTS
WO    2010047800 A2    4/2010

OTHER PUBLICATIONS

International Search Report and Written Opinion for PCT Application No. PCT/US2010/038467, dated Jul. 4, 2012, 10 pages.

*Primary Examiner* — Charles Freay
*Assistant Examiner* — Alexander Comley
(74) *Attorney, Agent, or Firm* — Westman, Champlin & Kelly, P.A.

(57) ABSTRACT

A fluid delivery system includes a pump operably coupleable to a source of fluid. A reciprocating electromagnetic actuator is coupled to the pump and has a coil that when energized causes the actuator to drive the pump. Coil current sensing circuitry is configured to provide an indication of current flowing in the coil. A controller is coupled to the coil current sensing circuitry and is configured to calculate a coil drive parameter based upon a plurality of coil current indications from the coil current sensing circuitry. Coil drive circuitry is coupled to the controller and is configured to supply current to the coil based on the coil drive parameter.

19 Claims, 5 Drawing Sheets

U.S. PATENT DOCUMENTS

| | | |
|---|---|---|
| 7,038,419 B1 * | 5/2006 | Beale et al. ............. 318/599 |
| 7,083,112 B2 * | 8/2006 | Ivri ........................... 239/4 |
| 7,102,303 B2 | 9/2006 | Brotto |
| 7,182,280 B2 * | 2/2007 | Ye et al. ................. 239/526 |
| 7,232,077 B2 * | 6/2007 | Turnbull ..................... 239/1 |
| 7,298,101 B2 * | 11/2007 | Watts et al. ............. 318/119 |
| 7,446,493 B2 | 11/2008 | Forster et al. |
| 2004/0005222 A1 | 1/2004 | Yoshida et al. |
| 2004/0263005 A1 * | 12/2004 | McGill et al. ............. 310/14 |
| 2005/0053470 A1 * | 3/2005 | Yamazaki et al. ...... 417/44.11 |
| 2008/0272150 A1 * | 11/2008 | Hahn et al. ............ 222/145.1 |
| 2010/0072300 A1 | 3/2010 | Miller et al. |

\* cited by examiner

DYNAMIC CONTROL OF AN ELECTRIC DRIVE

The present disclosure relates to dynamic control of an electric drive, and more specifically, but not by limitation, to dynamic control of an electric drive in a fluid delivery system using current sensing circuitry.

BACKGROUND

Electric drives comprise devices that use electrical energy to produce mechanical energy (e.g., motion) and are used in a variety of applications. Some electric drives produce rotational forces while some electric drives are configured to produce linear forces. Electric drives can be configured to operate using alternating current (AC) and/or direct current (DC).

Examples of applications in which electric drives are utilized include, but are not limited to, manufacturing environments, automotive applications, robotic applications, consumer appliances and hardware, and construction equipment, to name a few. One particular application in which an electric drive can be used is a fluid delivery system.

One example of a fluid delivery system includes a device configured to atomize a material (e.g., paints, inks, varnishes, textures, herbicides, insecticides, food products, etc.) that is sprayed through the air. For example, a spray-coating system often includes a fluid source and, depending on the particular configuration or type of system, an electric drive for providing pressurized fluid to an output nozzle or tip that directs the fluid in a desired spray pattern. For example, some common types of paint spraying systems employ compressed gas, usually air compressed by an air compressor, to atomize and direct paint particles onto a surface. Other common types of paint spraying systems include airless systems that employ a pumping unit for pumping paint from a paint source, such as a paint can. Pressurized paint is pumped from the source through a hose, for example, to a spray gun having a tip with a particular nozzle shape for directing the paint in a desired pattern.

During use, internal and/or external factors, such as environmental changes, can affect operation of an electric drive. For example, some factors can affect the resonance characteristics of an electric drive system. For instance, in the fluid delivery system example discussed above it may be possible that factors such as changes in the fluid media (e.g., the material being sprayed), the level of fluid in the source, the mass of the user, and/or the position of the system (e.g., sitting on a table, being held by a user), to name a few, can affect the resonance and performance of the electric drive.

The discussion above is merely provided for general background information and is not intended to be used as an aid in determining the scope of the claimed subject matter.

SUMMARY

A fluid delivery system includes a pump operably coupleable to a source of fluid. A reciprocating electromagnetic actuator is coupled to the pump and has a coil that when energized causes the actuator to drive the pump. Coil current sensing circuitry is configured to provide an indication of current flowing in the coil. A controller is coupled to the coil current sensing circuitry and is configured to calculate a coil drive parameter based upon a plurality of coil current indications from the coil current sensing circuitry. Coil drive circuitry is coupled to the controller and is configured to supply current to the coil based on the coil drive parameter.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present disclosure relates to dynamic control of an electric drive, and more specifically, but not by limitation, to dynamic control of an electric drive in a fluid delivery system using current sensing circuitry. In accordance with one embodiment, a current sensing component is utilized to provide information pertaining to a coil current of the electric drive. The current information is provided to a controller comprising a microprocessor, for example, to facilitate adjustment of operating parameters of the electric drive. In one embodiment, the electric drive is power by a DC source and, using pulse width modulation (PWM), a duty cycle (i.e., pulse time) is adjusted to control an amount of current supplied to the coil such that the electric drive operates within a desired or optimum range to provide power to a pump mechanism. The electric drive is configured to be dynamically controlled based on the current information provided by the current sensing component to operate in the desired or optimum range over varying conditions, such as, but not limited to, varying battery voltage, changes in material volume, changes in material viscosity, and/or other factors that can affect resonance or frequency within the system.

Figure 1:
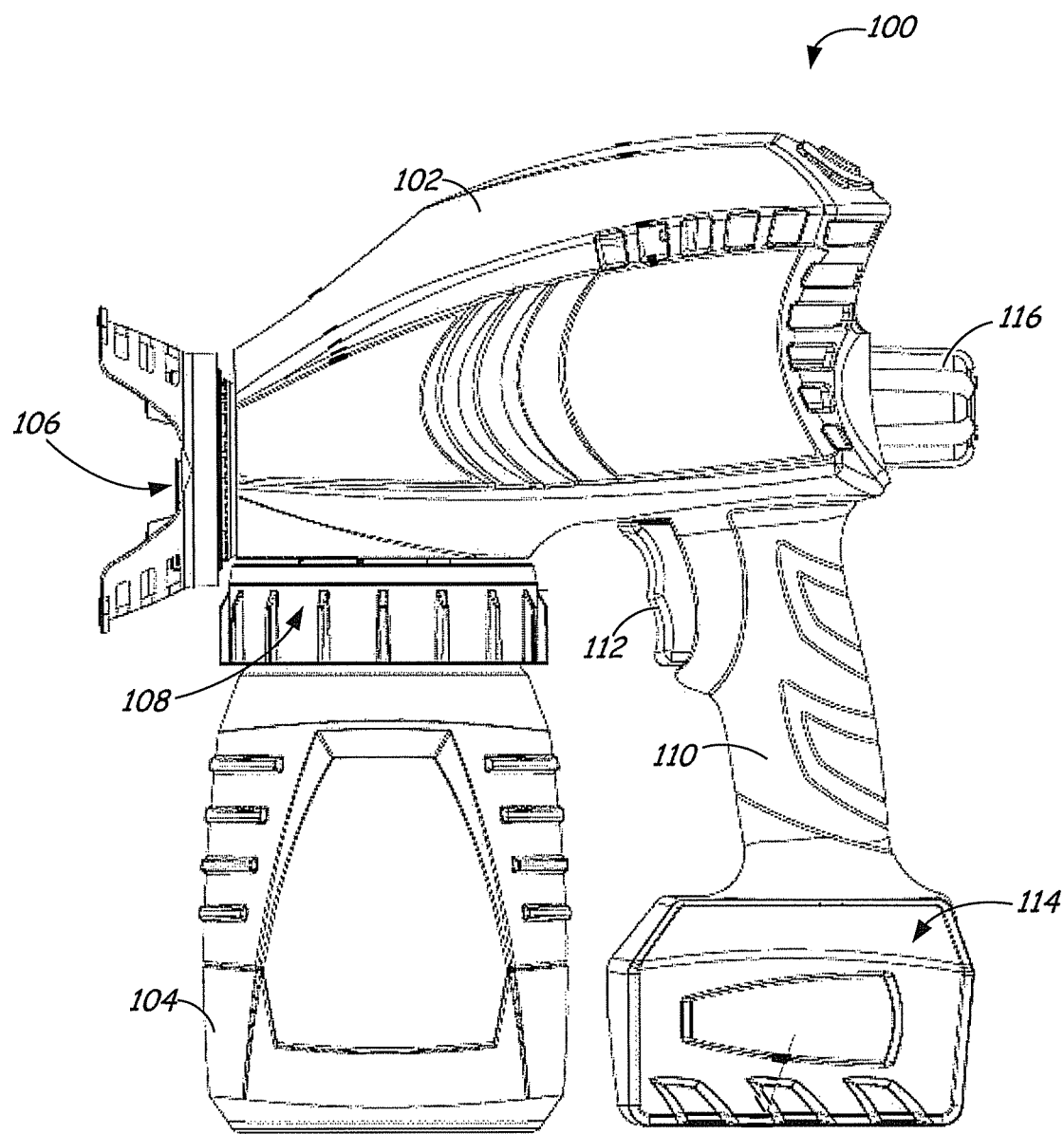
FIG. 1 illustrates an exemplary fluid delivery system.

FIG. 1 illustrates an exemplary fluid delivery system configured to atomize a material (e.g., paints, varnishes, stains, inks, etc.) that is delivered through the air onto a surface. In the embodiment illustrated in FIG. 1, the fluid delivery system comprises a handheld paint sprayer 100 for spraying paint material. However, sprayer 100 can be configured to deliver other types of material. Sprayer 100 illustratively comprises an airless system and uses a pumping unit for pumping the paint material from a paint source.

Sprayer 100 includes a housing 102 containing electrical components for controlling operation of sprayer 100 and an electric drive operably coupled to a pumping mechanism. The pumping mechanism supplies paint from a paint container 104 to an output nozzle 106 having a particular size and shape for generating a desired spray pattern. Paint container 104 is removably attached to housing 102 by a threaded connection 108. In one embodiment, the paint container 104 can be external to, and/or spaced apart from, sprayer 100. For example, in one embodiment paint container 104 comprises a paint can that it position on a floor or table. System 100 includes a tube for supplying paint from the paint can to housing 102.

Sprayer 100 also includes a handle 110 and a trigger 112 that allow a user to hold and control the operation of sprayer 100. Sprayer 100 also includes a power source for supplying power to the electric drive in housing 102. In the illustrated embodiment, the power source comprises a battery pack 114. Battery pack 114 can include primary (e.g., non-rechargeable) batteries and/or secondary (e.g., rechargeable) batteries. In one embodiment, the power source can comprise a battery that is external to sprayer 100. For example, power can be supplied to sprayer 100 from an external battery using a power cord. In one embodiment, the power source can comprise an AC power source, such as a wall outlet.

Sprayer 100 also includes a flow control knob 116 for controlling the flow of fluid, such as paint, through the pumping mechanism. Control knob 116 can be used to control the volume of the spray pattern out of nozzle 106.

Figure 2:
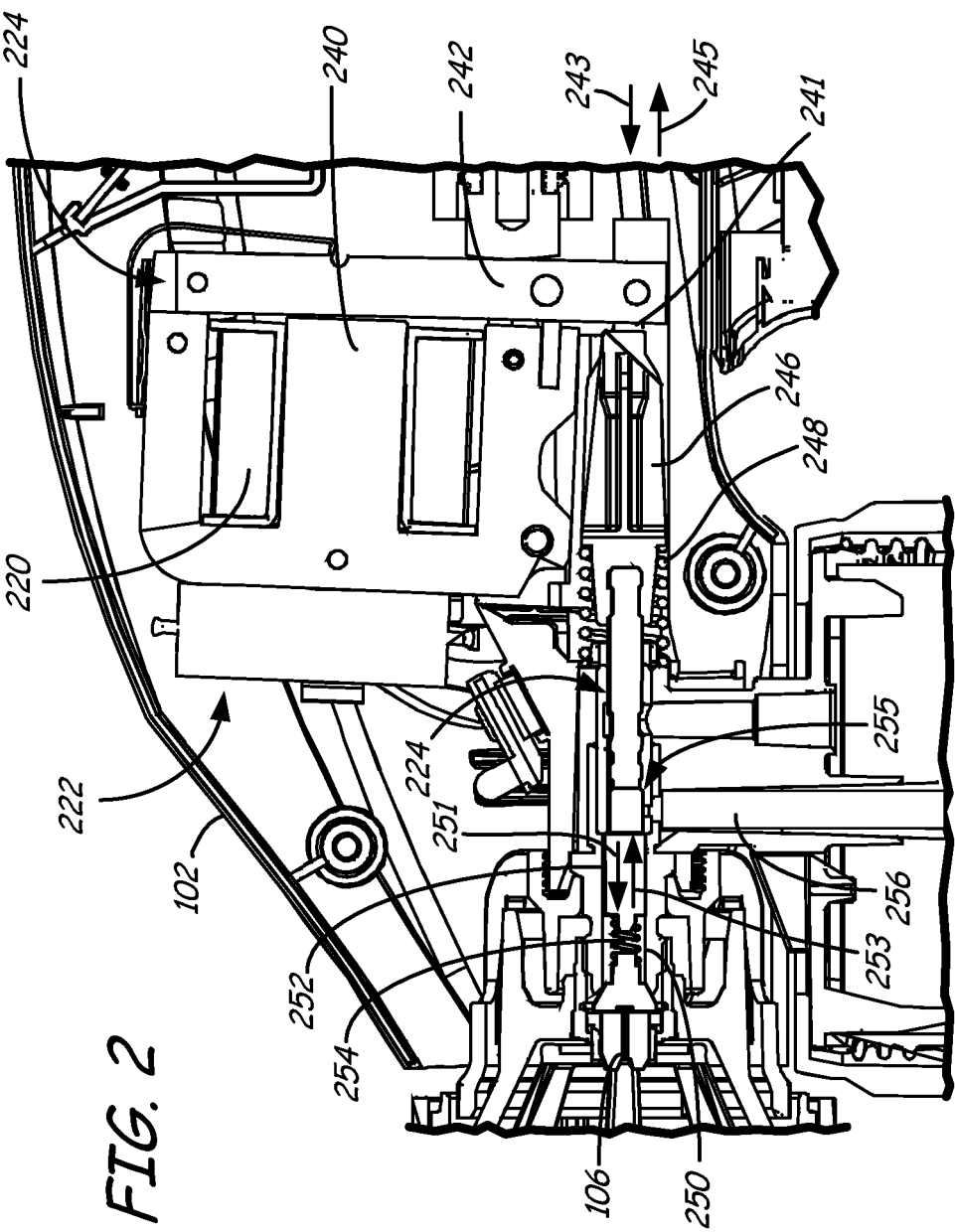
FIG. 2 is a cross-sectional view of the system illustrated in FIG. 1.

The electric drive of sprayer 100 comprises a device that uses electrical energy to produce mechanical energy that drives the pump mechanism. FIG. 2 is a cross-sectional view of a portion of sprayer 100 illustrating one embodiment of the electric drive. FIG. 2 illustrates some or all of the internal components of housing 102.

In the embodiment illustrated in FIG. 2, the electric drive comprises a reciprocating electromagnetic actuator 222 that is configured to drive the pump mechanism 224. In one embodiment, actuator 222 is referred to as an AC electromagnetic actuator that is configured to operate by applying an AC input to a coil of the actuator 222. In another example, actuator 222 can comprise a DC electromagnetic actuator that is configured to operate by applying a DC input to a coil of the actuator 222.

In the illustrated embodiment, power is supplied to the reciprocating electromagnetic actuator 222 from a DC power source (i.e., battery pack 114) using pulse width modulation (PWM) to provide a "simulated" AC power source. However, while actuator 222 is illustrated as receiving power from a DC power source (i.e., battery pack 114), it is noted that in other embodiments reciprocating electromagnetic actuator 222 can be configured to receive power from an AC power source.

Reciprocating electromagnetic actuator 222 includes a magnetic armature 242 and a coil 220 that is wrapped around at least a portion of a laminated stack (or "core") 240. The core/coil assembly is stationary or fixed within the housing 102 while the armature 242 is configured to move or pivot about a pivot assembly 244, for example. Thus, the armature 242 moves in one or more directions with respect to the core/coil assembly based on the current applied to the coil 220. In the illustrated embodiment, when current is applied to the coil 220 the armature 242 is magnetically attracted toward the core 240 (in a direction represented by arrow 243). The force at which the armature 242 is attracted toward the core 240 is proportional to (or otherwise related to) the amount of current applied to the coil 220.

Armature 242 is configured to mechanically contact and drive a piston 246 of the pump mechanism 224. Movement of piston 246 drives fluid through fluid path 250 toward output 106. The fluid is supplied from a fluid source (i.e., fluid container 104) though a fluid tube 256. A check valve 252 is provided in the fluid path 250 and allows fluid flow in a first direction 251. The check value 252 is biased by a spring 254 to prevent, or otherwise limit, the flow of fluid in a second direction 253.

Piston 246 includes a biasing mechanism (illustratively a spring 248) that biases the piston in a direction 245, which is opposite the direction 243 in which piston 246 is driven by armature 242. In this manner, armature 242 comprises a reciprocating member that moves or oscillates in response to forces applied by spring 248 and the magnetic field interaction between the coil 220 and armature 242. In one embodiment, a surface 241 that contacts the piston 246 is configured to move in substantially linear directions along a length of the fluid path 250. During a first action, a current is applied to coil 220 causing the armature 242 to contact piston 246 and drive paint through path 250 to output 106. During a second action, the current in the coil 220 is removed (or otherwise reduced) causing the spring 248 to actuate the piston 246 toward the armature 242. As the piston 246 is actuated by the spring 248, spring 254 operates to close the check valve 252. The closing of the check valve 252 and the actuation of spring 248 in direction 245 creates at least a partial vacuum in a portion 255 of fluid path 250, thus causing additional fluid to travel from the fluid container through the fluid tube 256. The additional fluid is then pumped through the fluid path 250 to the output 106 during a subsequent action of the pump mechanism. In one embodiment, the current applied to the coil 220 is pulsed between high and low values to cause reciprocation of armature 242 to drive piston 246.

Figure 3:
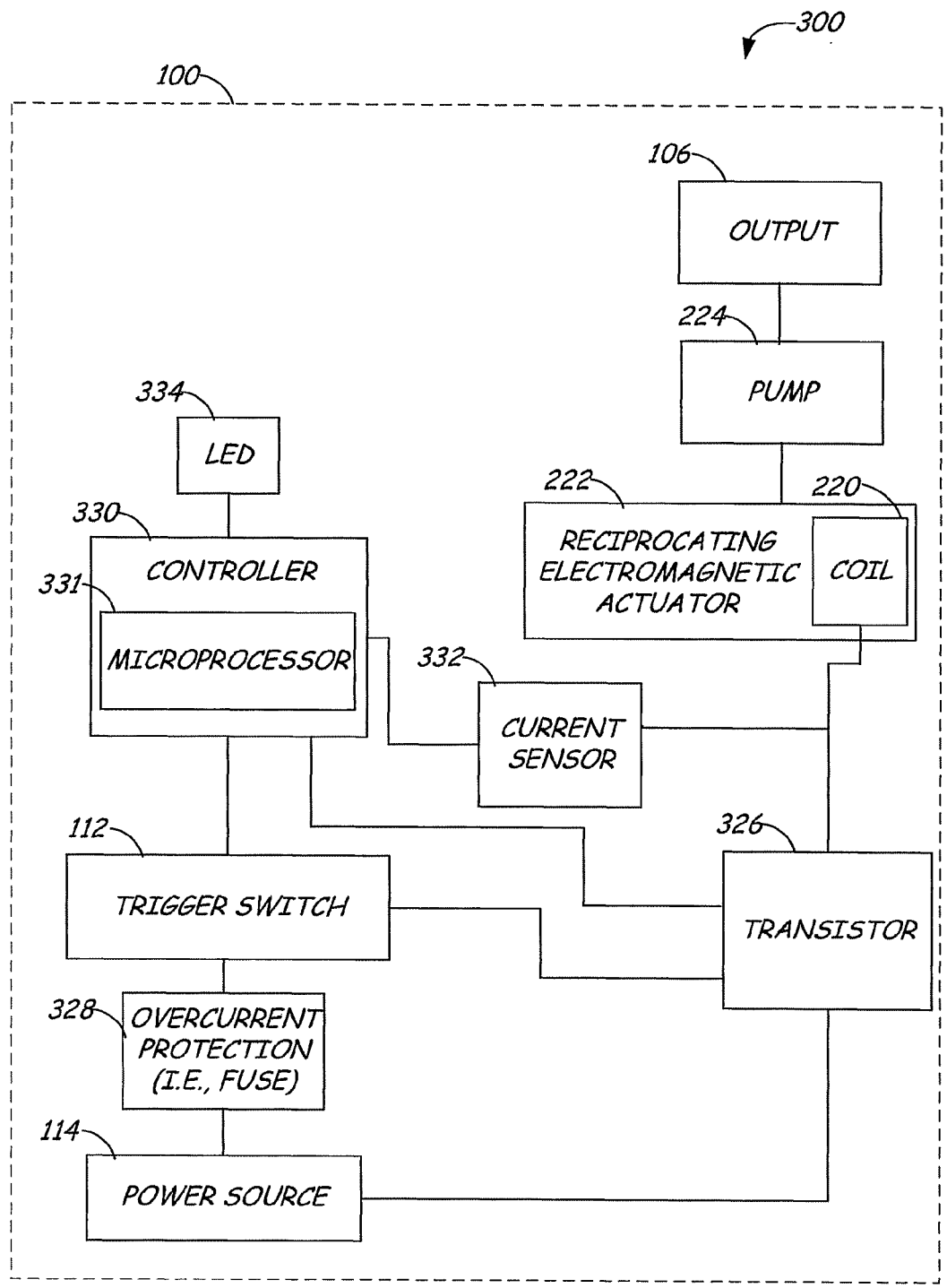
FIG. 3 is a schematic block diagram of one embodiment of the fluid delivery system illustrated in FIG. 1.

FIG. 3 illustrates a schematic block diagram 300 of sprayer 100. As illustrated, DC power source 114 is configured to supply power to a coil 220 of reciprocating electromagnetic actuator 222. In one embodiment, reciprocating electromagnetic actuator 222 is configured to operate at 120 Hz. In this manner, piston 246 is actuated by armature 242 once every 8.33 milliseconds (ms). However, it is noted that other types and configurations of the electric drive can be utilized in sprayer 100.

Electromagnetic actuator 222 is operably coupled to pumping mechanism 224 to spray paint from output 106. In the illustrated embodiment, the power from power source 114 is provided to the electromagnetic actuator 222 through a transistor 326 based on the status of mechanical trigger switch 112. An overcurrent protection component 328, such as a fuse, is also utilized.

In accordance with one embodiment, a controller 330 utilizes pulse width modulation (PWM) and modulates the duty cycle (i.e., the pulse widths) to control the amount of current supplied to, and thus the mechanical power generated by, electromagnetic actuator 222. In one embodiment, a microprocessor 331 is provided in sprayer 100 to control the current supplied to the coil 220 of electromagnetic actuator 222.

In accordance with one embodiment, electromagnetic actuator 222 is dynamically controlled using the microprocessor 331 based on a signal received from a current sensor 332. Current sensor 332 provides current information to controller 330 indicative of the current in coil 220. The input received from current sensor 332 is utilized by microprocessor 331 to control the pulses for the PWM. In one example, current sensor 332 comprises a resistor across which a voltage is measured, the voltage being proportional to the coil current. In another example, current sensor 332 comprises any suitable electrical component having a quantifiable resistance that can be used to measure the coil current. Examples of electrical components include, but are not limited to, resistors, capacitors, transistors, diodes, et cetera.

In the embodiment illustrated in FIG. 3, an alarm or visual indicator (such as LED 334) is provided to indicate a particular status of sprayer 100. For example, LED 332 can be utilized to indicate a particular power condition such as low battery voltage, high battery voltage, high current draw, or any other condition of interest.

Figure 4:
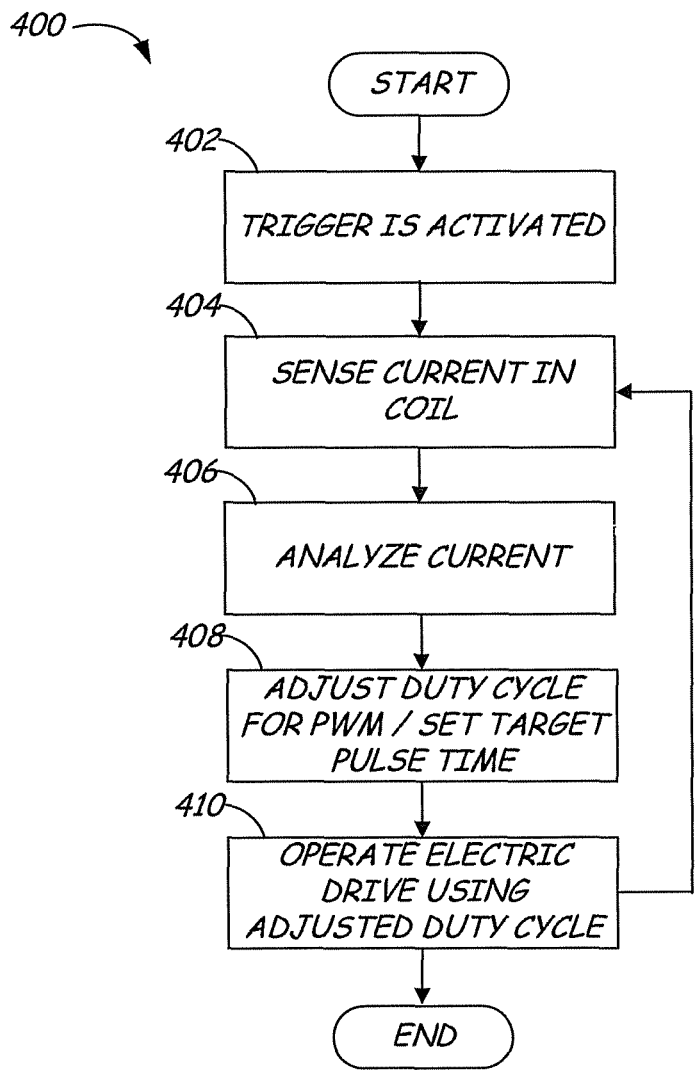
FIG. 4 is a flow diagram illustrating a method for dynamically controlling operation of an electric drive, under one embodiment.

FIG. 4 is a flow diagram illustrating a method 400 for utilizing current sensed by current sensor 332 to dynamically control operation of electromagnetic actuator 222 in sprayer 100. In one embodiment, some or all of method 400 is implemented by microprocessor 331.

In the example illustrated in FIG. 4, the pulse cycle time for the pulse width modulation (PWM) is set for a frequency of 120 Hertz (Hz). However, it is noted that this is one example and is not intended to limit the scope of the concepts herein. In other embodiments, the pulse cycle time can be set for any desired frequency such as, but not limited to, 50 Hz, 60 Hz, 100 Hz, et cetera.

At step 402, the trigger (i.e., trigger 112) of sprayer 100 is activated. For example, a user initially depresses and holds the trigger 112. In one embodiment, upon activation of the trigger the voltage level of the battery 114 is checked. Based on the battery voltage level, the indicator LED 334 can be illuminated and/or operation of sprayer 100 can either be allowed or disabled.

At step 404, the current in coil 220 of electromagnetic actuator 222 is sensed using current sensor 332. Current information is provided to microprocessor 331, which analyzes the current information at step 406. For example, microprocessor 331 can access a lookup table to determine if the coil current is within a predetermined range. In one embodiment, the predetermined range for the coil current is based on the design and characteristics of sprayer 100 and is indicative of a desired, acceptable operation of electromagnetic actuator 222.

Based on the current analysis at step 406, the microprocessor 331 can adjust the duty cycle (i.e., pulse times) for the PWM at step 408. For example, the on and off times for each pulse cycle can be adjusted based on the current information feedback such that the coil current for subsequent pulse cycles is within the predetermined range. In one embodiment, the microprocessor 331 sets a "target" pulse time for one or more subsequent pulse cycles. At step 410, if the trigger 112 remains activated (i.e., depressed), the electromagnetic actuator 222 is operated using the adjusted duty cycle (i.e., the "target" pulse time).

In accordance with one embodiment, the "target" pulse time can be further adjusted during subsequent iterations in which steps 404-410 are repeated. For example, steps 404-410 can be repeated for the first M pulse cycles. In one instance, steps 404-410 are repeated for the first 9 pulse cycles. In another embodiment, the number of pulse cycles for which steps of method 400 are repeated can be greater than, or less than, 9 pulse cycles. Moreover, in one embodiment one or more steps of method 400 are implemented periodically. For example, if the trigger remains depressed, the method 400 can be repeated after every N seconds (e.g., 0.5 seconds, 1 second, 2 seconds, et cetera). It is noted that each iteration of method 400 can utilize different coil current and/or pulse time thresholds for determining the "target" pulse time.

During use of sprayer 100, internal and/or external factors (such as environmental changes) can affect operation of electromagnetic actuator 222. For example, some factors can affect the resonance characteristics of the sprayer 100. For instance, changes in the paint material (such as the consistency, viscosity, et cetera), the level of fluid in container 104, the size of and grip of the user operating sprayer 100, and/or the position of the sprayer 100 (e.g., sitting on a table, being held by the user), can affect the resonance of sprayer 100. Potentially, these changes can have undesired effects on the performance of sprayer 100. By utilizing the input from current sensor 332, microprocessor 331 is able to dynamically control electromagnetic actuator 222 to compensate for such changes and enable electromagnetic actuator 222 to operate with optimum performance over varying conditions, for example.

Figure 5:
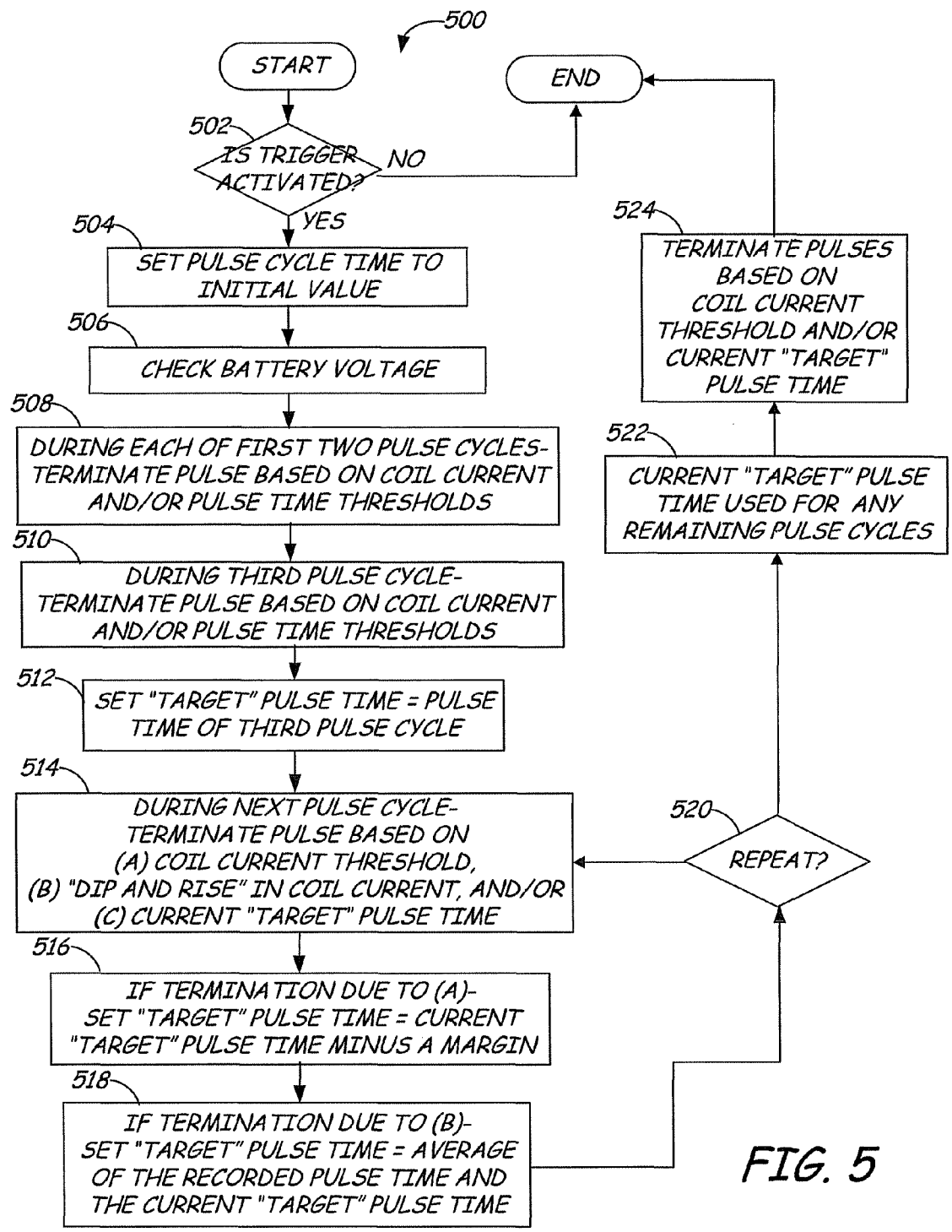
FIG. 5 is a flow diagram illustrating a method for dynamically controlling operation of an electric drive, under one embodiment.

FIG. 5 illustrates one particular embodiment of a method 500 for dynamically controlling electromagnetic actuator 222. At step 502, if the trigger is activated the method proceeds to block 504 in which the pulse cycle time is set to an initial value based on the frequency for operation of electromagnetic actuator 222. For example, in one embodiment the pulse cycle time for the pulse width modulation (PWM) is set for a frequency of 120 Hz. In one example, the period for each cycle is approximately 8.33 milliseconds (ms).

At step 506, the battery voltage can be checked. In one embodiment, the method determines the minimum battery voltage during a period of time (e.g., one or more cycles) after the trigger is activated. The battery voltage may fluctuate during the period of time as a result of the current draw, for instance. For example, the battery voltage may be at a maximum level when the sprayer 100 is not being operated. The battery voltage may drop to the minimum battery voltage level when the trigger is activated and current is being supplied to electromagnetic actuator 222.

If the minimum battery voltage is at or below a first voltage threshold (e.g., 15.5 volts (V)), the indicator LED 334 is illuminated and operation of the sprayer is disabled. If the minimum battery voltage is between the first voltage threshold and a second voltage threshold (e.g., 17.5V), the LED 334 is flashed and operation of the sprayer is allowed. If the battery voltage is above the second voltage threshold, the LED 334 is not illuminated and operation of the sprayer is allowed.

At step 508, the coil 220 is charged during the first two pulse cycles. The pulse during each of the first two pulse cycles is terminated if a particular termination condition is met. For example, the pulse can be terminated if the coil current is greater than a current threshold and/or a maximum pulse time is reached. The coil current threshold and/or maximum pulse time threshold can be obtained by accessing a lookup table, in one embodiment. In one example, the coil current threshold at step 508 is approximately 25 amps (A) and the maximum pulse time threshold is approximately 7.8 ms. After the pulses have been terminated, the off time for the remaining portion of the pulse cycles is calculated based on 120 Hz (or other frequency, based on the system).

At step 510, during the third pulse cycle, the pulse is terminated if a termination condition is met. For example, the third pulse is terminated if the coil current is greater than a current threshold, a "dip and rise" in the coil current is detected, and/or a maximum pulse time is reached. As used herein, a "dip and rise" means the coil current reaches a local minima following a coil current decrease. In one embodiment, at step 510 the current threshold is approximately 18.5 A and the maximum pulse time is approximately 6.5 ms.

When the pulse is terminated at step 510, the duration of the pulse during the third pulse cycle is saved as the "target" pulse time at step 512. If the "target" pulse time is determined to be too short (e.g., less than 5 ms), the "target" pulse time can be set to a default (i.e., 5 ms). The off time for the remaining portion of the pulse cycle is calculated based on 120 Hz. As illustrated, in one embodiment the first two pulse cycles are disregarded and are not used to calculate the "target" pulse time.

At step 514, during the next pulse cycle (in this case the fourth pulse cycle), the pulse is terminated if a termination condition is met. For example, the pulse can be terminated at step 514 if the coil current is greater than a current threshold, a "dip and rise" in the coil current is detected, and/or the pulse time equals the "target" pulse time set at step 512.

If the pulse is terminated due to the current threshold, at step 516 the new, adjusted "target" pulse time is set to be equal to the current "target" pulse time (set at step 512) minus a margin. In one embodiment, the margin is 277 microseconds (μs), for example.

If the termination of the pulse at step 514 is due to a detected "dip and rise" in the coil current, at step 518 the new, adjusted "target" pulse time is set to be the average of the pulse time recorded at step 514 and the current "target" pulse time (set at step 512).

After the pulse is terminated at step 514, the off time for the remaining portion of the cycle is calculated based on 120 Hz.

At step 520, method 500 determines whether to repeat steps 514-518 for additional pulse cycles. In one embodiment, steps 514-518 are repeated for the next N pulse cycles. In one example, steps 514-518 are repeated for the next 5 pulse cycles (i.e., pulse cycles 5-9). In other examples, steps 514-518 are repeated for more than, or less than, the next 5 pulse cycles.

At step 522, the current "target" pulse time is used for any remaining pulse cycles. In one example, the pulse cycles continue for as long as the trigger remains activated. For each of the remaining pulse cycles, the pulses are terminated based on a termination condition. For example, as illustrated in step 524 the pulses are terminated based on a current threshold and/or the current "target" pulse time.

In accordance with one embodiment, some or all of the steps of establishing a "target" pulse time illustrated in steps 504-518 can be repeated periodically. For example, the "target" pulse time can be recalculated periodically, such as every N seconds (e.g., 0.5 seconds, 1 second, 2 seconds, et cetera). It is noted that this is one example, and is not intended to limit the scope of the concepts described herein.

In method 500, for each step where the pulse is terminated based on coil current thresholds and/or maximum pulse time thresholds (e.g., steps 508, 510, 514, etc.), it is noted that different thresholds can be utilized for one or more of the steps, for example by accessing a lookup table stored in controller 330.

While various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed:

1. An airless paint sprayer comprising:
    a pump;
    a reciprocating electromagnetic actuator operably coupled to the pump, the actuator having a coil that when energized causes the actuator to drive the pump;
    coil current sensing circuitry configured to provide an indication of current flowing in the coil;
    coil drive circuitry configured to supply current to the coil; and
    a controller coupled to the coil current sensing circuitry and the coil drive circuitry to supply current pulses to the coil during a plurality of pulse cycles, each pulse cycle having a pulse on-time in which current is applied to the coil and a pulse off-time, the controller being configured to:
        set a target pulse on-time threshold;
        monitor a current pulse applied to the coil during a particular one of the pulse cycles;
        terminate the monitored current pulse if a duration of the monitored current pulse meets the target pulse on-time threshold; and
        determine whether an amplitude of the monitored current pulse meets an amplitude threshold and, in response:
            terminate the monitored current pulse;
            determine the pulse on-time of the monitored current pulse that was terminated;
            adjust the target pulse on-time threshold based on the determined pulse on-time; and
            terminate a current pulse applied to the coil during one or more subsequent pulse cycles based on the adjusted target pulse on-time threshold.

2. The airless paint sprayer of claim 1, wherein each of the plurality of pulse cycles has a substantially similar pulse cycle period.

3. The airless paint sprayer of claim 2, wherein the period of each pulse cycle is approximately 8.33 milliseconds.

4. The airless paint sprayer of claim 2, wherein the controller comprises a microprocessor.

5. The airless paint sprayer of claim 1, and further comprising a battery pack operably coupled to the coil through the coil drive circuitry.

6. The airless paint sprayer of claim 1, wherein the reciprocating electromagnetic actuator comprises an armature configured to pivot about a pivot assembly and drive a piston of the pump, and wherein the piston includes a biasing mechanism, and wherein the armature is configured to move the piston in a first direction and the biasing mechanism is configured to move the piston in a second direction, the first and second directions being anti-parallel.

7. A method of operating an airless paint sprayer having an electric drive with an inductive drive coil, the method comprising:
    setting a target pulse on-time threshold;
    providing current pulses to the inductive drive coil during a series of pulse cycles, each current pulse having a pulse on-time in which current is applied to the inductive drive coil;
    for a non-first pulse cycle in the series of pulses cycles,
        sensing a current pulse in the inductive drive coil during the non-first pulse cycle;
        determining that the current pulse applied during the non-first pulse cycle satisfies a threshold condition;
        based on the determination, instantaneously terminating the current pulse by removing current from the inductive drive coil during the non-first pulse cycle;
    setting a target pulse on-time threshold for one or more subsequent pulse cycles, subsequent to the non-first pulse cycle; and
    terminating a current pulse during the one or more subsequent pulse cycles based on the target pulse on-time threshold.

8. The method of claim 7, wherein terminating the current pulse during the non-first pulse cycle comprises:
    determining the pulse on-time for the terminated current pulse; and
    calculating a pulse off-time for the non-first pulse cycle based on the determined pulse on-time.

9. The method of claim 7, and further comprising initiating the method in response to a trigger pull on the airless paint sprayer sprayer.

10. The method of claim 7, wherein the method is repeated periodically.

11. A fluid sprayer comprising:
a fluid pump;
an electric drive operably coupled to the fluid pump, the electric drive having a coil that when energized causes the electric drive to drive the pump to pressurize, fluid;
a spray nozzle configured to emit the pressurized fluid in a spray pattern;
a coil drive component configured to apply current pulses to the coil during a series of pulse cycles at a particular frequency, each current pulse being applied during a pulse on-time of a corresponding pulse cycle having a first duty cycle;
coil current sensing circuitry configured to provide an indication of current flowing in the coil; and
a controller configured to receive the indication of current flowing in the coil and adjust a duty cycle of at least one subsequent pulse cycle based on the indication of current flowing in the coil, wherein the at least one subsequent pulse cycle is subsequent to the series of pulse cycles and is applied to the coil at the same particular frequency, wherein the controller is configured to instantaneously terminate the current pulse applied to the coil based on the indication of current flowing in the coil.

12. The fluid sprayer of claim 11, wherein the series of pulse cycles and the at least one subsequent pulse cycle have substantially the same cycle period, and the at least one subsequent pulse cycle has a second duty cycle that is different than the first duty cycle.

13. The fluid sprayer of claim 11, wherein the controller is configured to calculate a coil drive parameter based upon a plurality of coil current indications, each of the plurality of coil current indications corresponds to a different current pulse applied to the coil.

14. The fluid sprayer of claim 12, wherein the at least one subsequent pulse cycles has a pulse off-time that is different than the pulse off-time of the series of pulse cycle having the first duty cycle.

15. The method of claim 7, wherein the one or more subsequent pulse cycles have a cycle period that is substantially similar to the series of pulse cycles, and wherein configuring comprises:
adjusting a duty cycle for the one or more subsequent pulse cycles.

16. The method of claim 7, further comprising:
sensing an amplitude and a duration of the current pulse applied to the inductive drive coil during the non-first pulse cycle, wherein the threshold condition pertains to at least one of the target pulse on-time threshold, a threshold current amplitude, and a dip and rise in the current pulse.

17. The airless paint sprayer of claim 4, wherein the pulse cycle period of the at least one subsequent pulse cycle is substantially similar to the pulse cycle period of the plurality of pulse cycles.

18. The airless paint sprayer of claim 1, the controller being further configured to, upon termination of the monitored current pulse, calculate the off time for a remaining portion of the particular pulse cycle.

19. The fluid sprayer of claim 11, wherein the fluid sprayer comprises a handheld airless paint sprayer.

* * * * *